(12) United States Patent
Campbell, II

(10) Patent No.: US 11,173,589 B2
(45) Date of Patent: Nov. 16, 2021

(54) METHODS AND APPARATUS FOR A FASTENER HEAD HAVING A DUAL ZONE SOCKET AREA AND A MATING DRIVER BIT

(71) Applicant: Bryce Fastener Company, Inc., Gilbert, AZ (US)

(72) Inventor: Richard Bryce Campbell, II, Gilbert, AZ (US)

(73) Assignee: Bryce Fastener Company, Inc., Gilbert, AZ (US)

( * ) Notice: Subject to any disclaimer, the term of this patent is extended or adjusted under 35 U.S.C. 154(b) by 418 days.

(21) Appl. No.: 16/181,537

(22) Filed: Nov. 6, 2018

(65) Prior Publication Data
US 2020/0139523 A1   May 7, 2020

(51) Int. Cl.
*B25B 23/10*     (2006.01)
*F16B 23/00*    (2006.01)
*B25B 15/00*    (2006.01)

(52) U.S. Cl.
CPC .......... *B25B 23/108* (2013.01); *B25B 15/004* (2013.01); *B25B 15/008* (2013.01); *F16B 23/003* (2013.01); *F16B 23/0007* (2013.01); *F16B 23/0038* (2013.01)

(58) Field of Classification Search
CPC .... B25B 23/108; B25B 15/004; B25B 15/008
USPC .......................................................... 81/436
See application file for complete search history.

(56) References Cited

U.S. PATENT DOCUMENTS

| | | | |
|---|---|---|---|
| 2,777,353 A | 1/1957 | Willis | |
| 4,970,922 A | 11/1990 | Krivec | |
| 5,105,690 A | 4/1992 | Lazzara et al. | |
| 5,171,117 A | 12/1992 | Seidl | |
| 5,435,680 A | 7/1995 | Schuster | |
| 5,461,952 A * | 10/1995 | Goss ..................... | B25B 13/065 411/404 |
| 6,575,061 B2 * | 6/2003 | Wagner ............... | F16B 23/0007 81/121.1 |
| 2005/0166724 A1 | 8/2005 | Castaneda | |
| 2006/0078404 A1 | 4/2006 | Dilling | |
| 2009/0003967 A1 | 1/2009 | Luna | |

(Continued)

FOREIGN PATENT DOCUMENTS

DE   102016003880 A1   10/2017

*Primary Examiner* — Hadi Shakeri
(74) *Attorney, Agent, or Firm* — Noblitt & Newson, PLLC

(57) ABSTRACT

Methods and apparatus for a fastener head having a dual zone socket area and a mating driver bit according to aspects of the present technology include a fastener configured with driving surfaces adapted to provide enhanced engagement between each other during use. The fastener includes a recessed socket area with a sidewall that has an upper inwardly tapering section and a lower vertical section that extends to the bottom of the recessed socket area. The upper inwardly tapering section of the sidewall may also include an offset relative to the lower vertical section to create asymmetrical driving and removal surfaces. The technology also includes a corresponding mating driver bit configured with mating surfaces to the fastener to provide enhanced engagement between the fastener and mating driver bit. The technology also allows either the fastener or the driving bit to be used with preexisting fasteners and driver bits.

5 Claims, 10 Drawing Sheets

(56) References Cited

U.S. PATENT DOCUMENTS

| | | |
|---|---|---|
| 2011/0217143 A1 | 9/2011 | Hughes et al. |
| 2013/0298737 A1 | 11/2013 | Lukes |
| 2015/0266169 A1* | 9/2015 | Campbell, II ......... B21K 1/463 |
| | | 81/436 |
| 2017/0095909 A1 | 4/2017 | Chen |
| 2017/0106507 A1 | 4/2017 | Campbell |
| 2018/0106286 A1 | 4/2018 | Cone, III et al. |

* cited by examiner

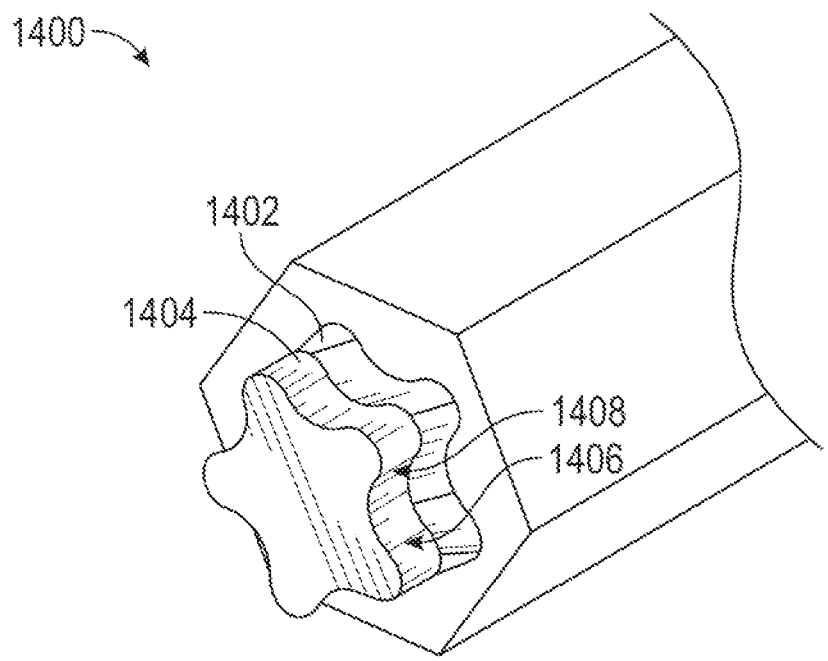
FIG. 15
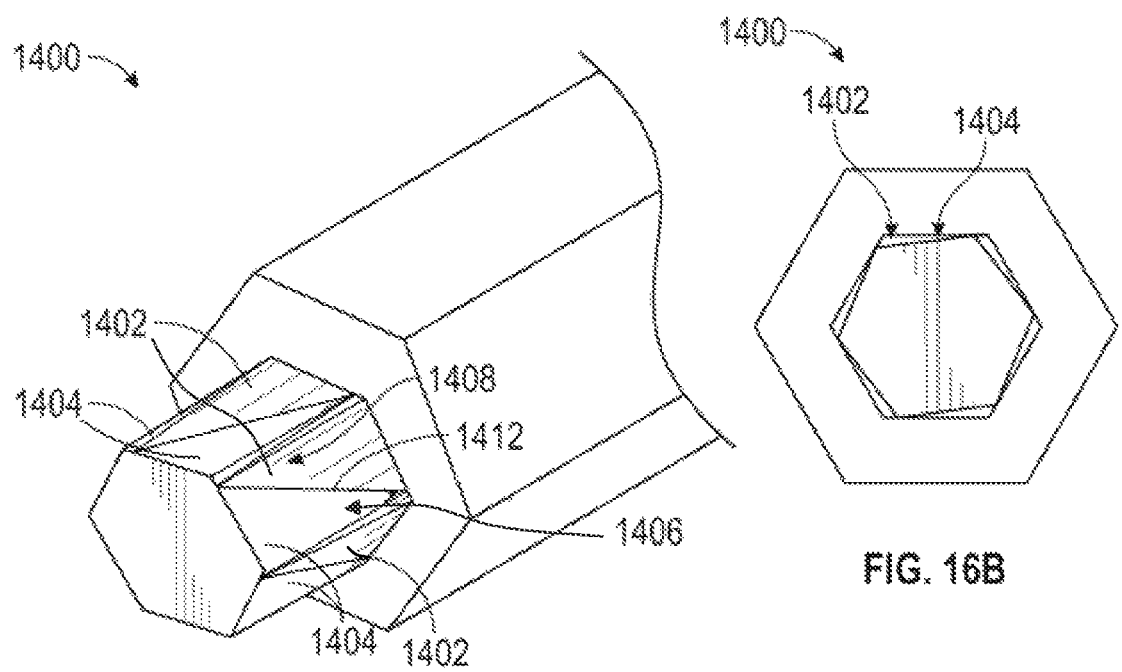
FIG. 16A
FIG. 16B

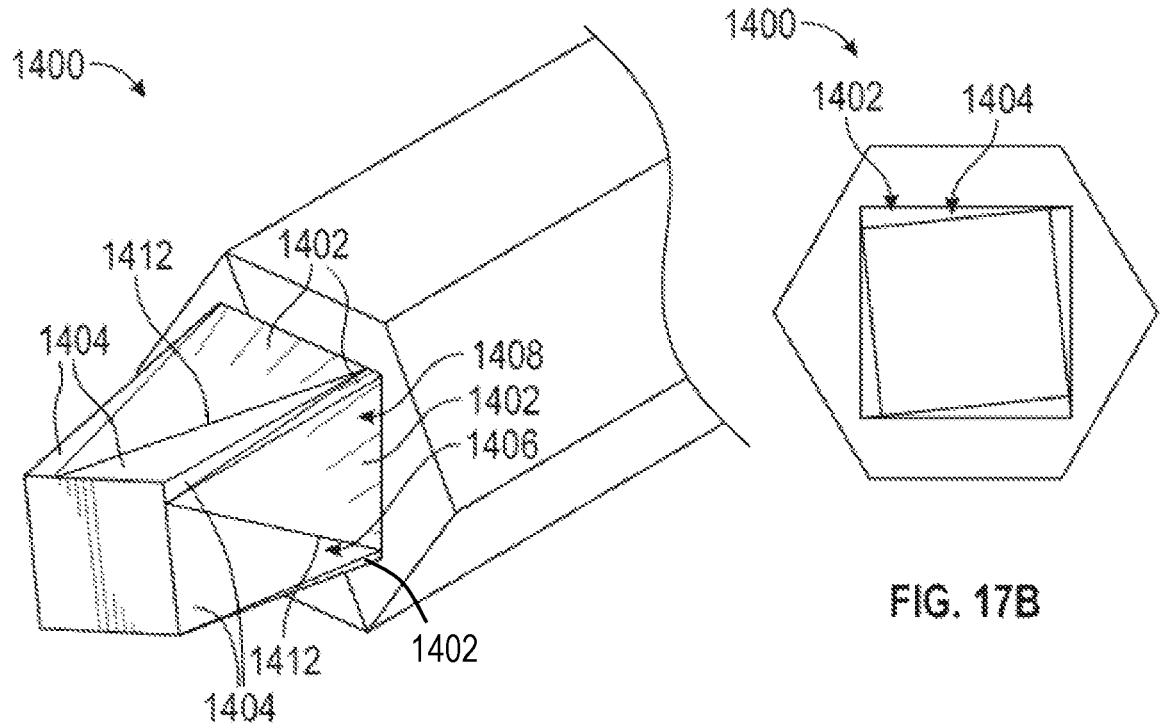
FIG. 17A
FIG. 17B
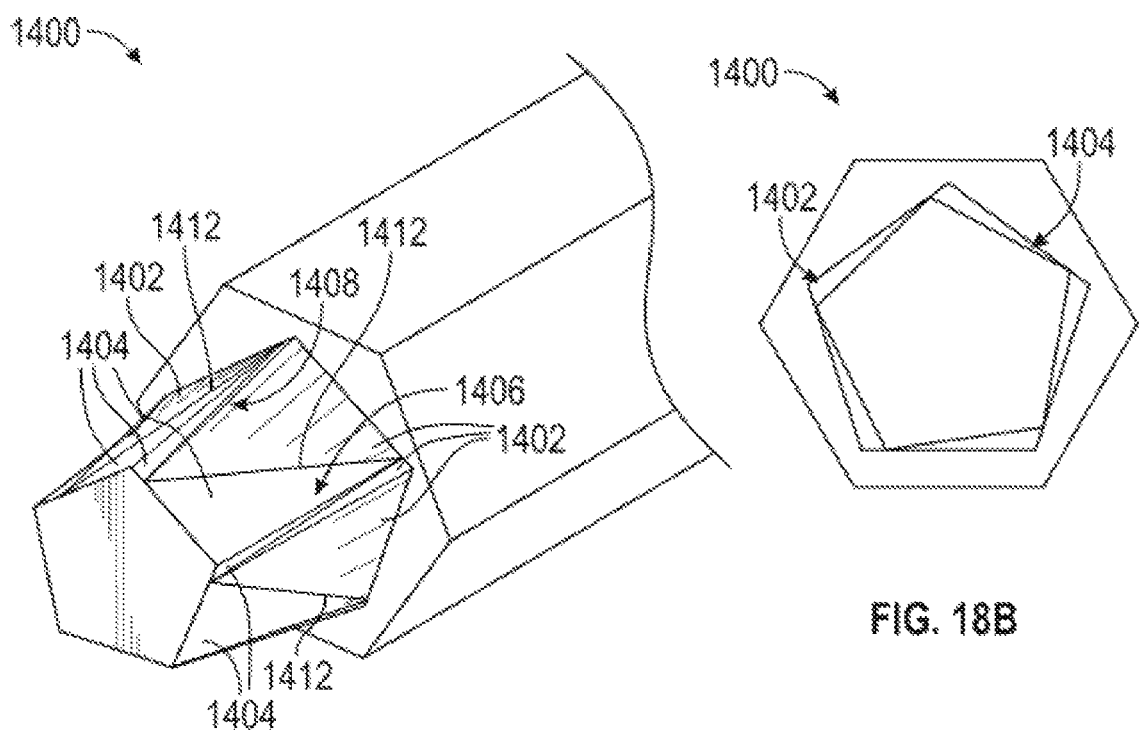
FIG. 18A
FIG. 18B

METHODS AND APPARATUS FOR A FASTENER HEAD HAVING A DUAL ZONE SOCKET AREA AND A MATING DRIVER BIT

BACKGROUND OF INVENTION

Presently fasteners are made with variously shaped recessed sockets and matched driving tools such as the Phillips design, straight walled hexagon, and other multi-lobe geometries. The walls and faces of the driver and recess typically are designed to fit closely with each other to achieve as much face-to-face (mating) contact between the driving member and driven surfaces of the fastener as possible. To enable insertion of the driver into the recess, however, there must be some clearance between the driver and the recessed socket area of the fastener. As a result, the area of contact is typically less than full face-to-face contact between the driver and the recessed socket area of the fastener. Consequently, when torque is applied by the driver, the forces applied to the fastener head and driver are concentrated in localized stress regions. These localized stresses may lead to deformation to the driver or fastener, breakage of the driver, and premature cam-out of the fastener.

Poor fit between the recessed socket area and the driver is also caused by anti-corrosive coatings applied that may not be factored into design tolerance specifications. These coatings are often paints, applied by a "dip spin" method, which are thicker than zinc plating. The coatings shorten the depth the driver can extend into the recessed socket area which may cause premature cam-out due to a reduction in the surface contact that could be achieved absent a coating.

SUMMARY OF THE INVENTION

Methods and apparatus for a fastener head having a dual zone socket area and a mating driver bit according to aspects of the present technology include a fastener configured with driving surfaces adapted to provide enhanced engagement between each other during use. The fastener includes a recessed socket area with a sidewall that has an upper inwardly tapering section and a lower vertical section that extends to the bottom of the recessed socket area. The upper inwardly tapering section of the sidewall may also include an offset relative to the lower vertical section to create asymmetrical driving and removal surfaces. The technology also includes a corresponding mating driver bit configured with mating surfaces to the fastener to provide enhanced engagement between the fastener and mating driver bit. The technology also allows either the fastener or the driving bit to be used with preexisting fasteners and driver bits.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

FIG. 15 representatively illustrates a perspective view of a driver bit corresponding to the socket area of FIGS. 4 and 5 in accordance with an exemplary embodiment of the present technology;

FIG. 16A representatively illustrates a perspective view of a driver bit corresponding to the socket area of FIGS. 6-8 in accordance with an exemplary embodiment of the present technology;

FIG. 16B representatively illustrates an end view of the driver bit of FIG. 16A in accordance with an exemplary embodiment of the present technology;

FIG. 17A representatively illustrates a perspective view of a driver bit corresponding to the socket area of FIG. 9 in accordance with an exemplary embodiment of the present technology;

FIG. 17B representatively illustrates an end view of the driver bit of FIG. 17A in accordance with an exemplary embodiment of the present technology;

FIG. 18A representatively illustrates a perspective view of a driver bit corresponding to the socket area of FIG. 10 in accordance with an exemplary embodiment of the present technology;

FIG. 18B representatively illustrates an end view of the driver bit of FIG. 18A in accordance with an exemplary embodiment of the present technology;

DETAILED DESCRIPTION OF EXEMPLARY EMBODIMENTS

Figure 1:
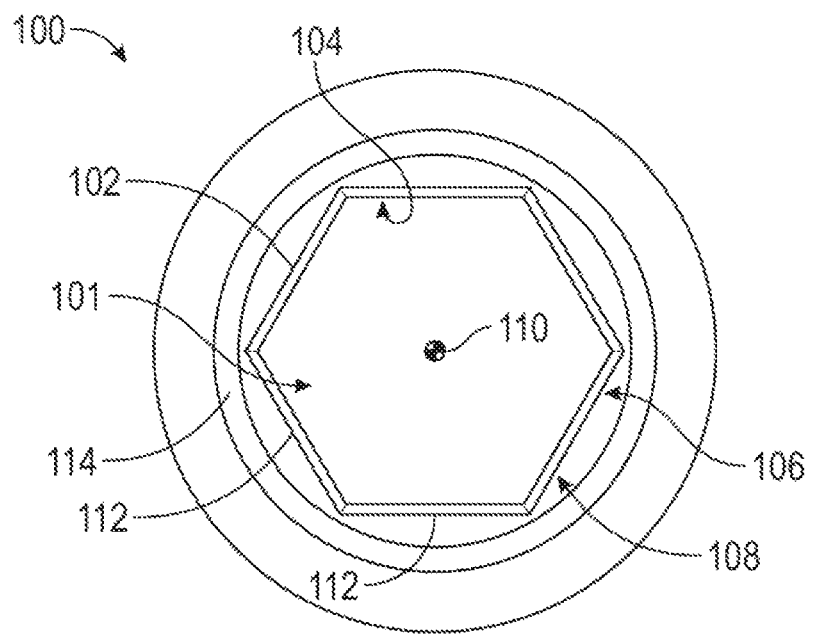
FIG. 1 representatively illustrates a top view of a fastener in accordance with an exemplary embodiment of the present technology.
Figure 2:
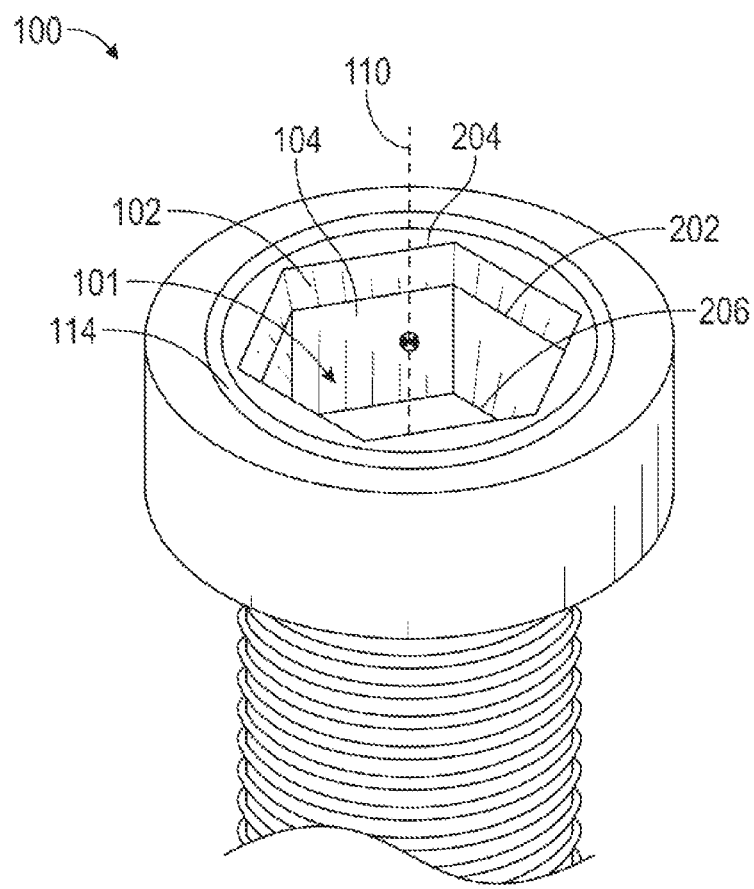
FIG. 2 representatively illustrates a first perspective view of the fastener and recessed socket area in accordance with an exemplary embodiment of the present technology.
Figure 3:
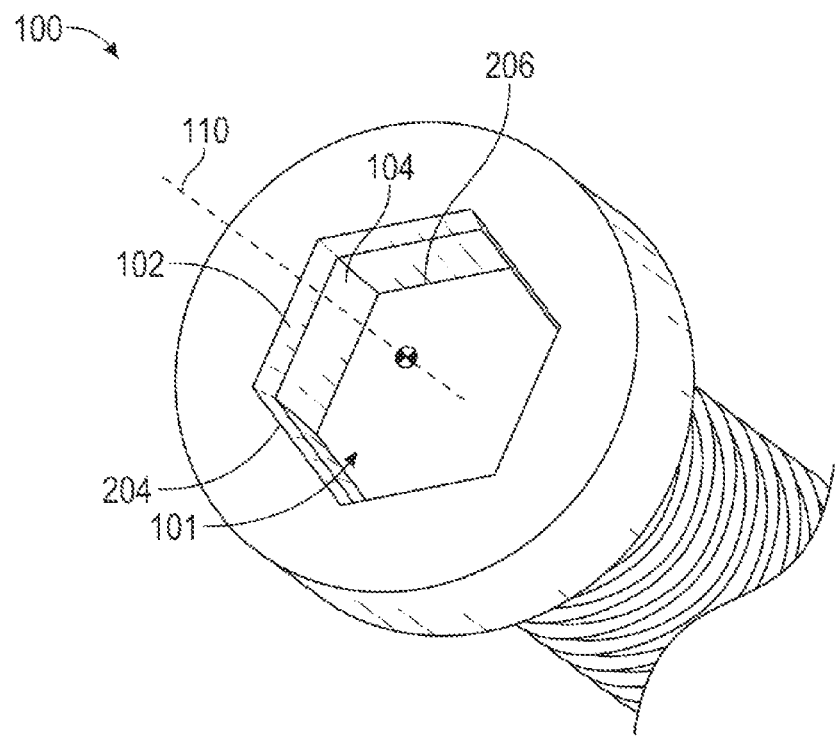
FIG. 3 representatively illustrates a second perspective view of the fastener and recessed socket area in accordance with an exemplary embodiment of the present technology.
Figure 4:
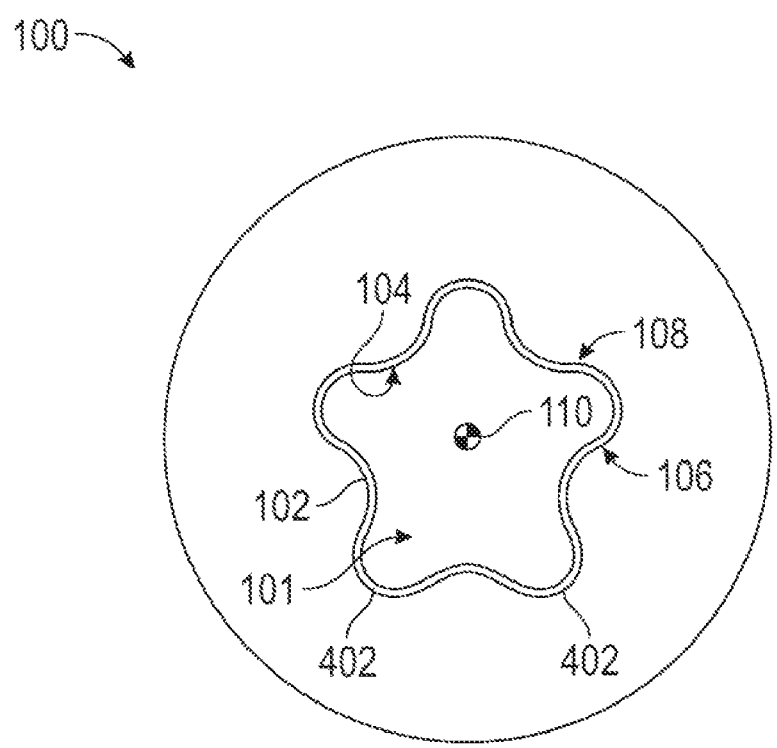
FIG. 4 representatively illustrates a top view of an alternatively shaped socket area of a fastener having five recessed lobes in accordance with an exemplary embodiment of the present technology.
Figure 5:
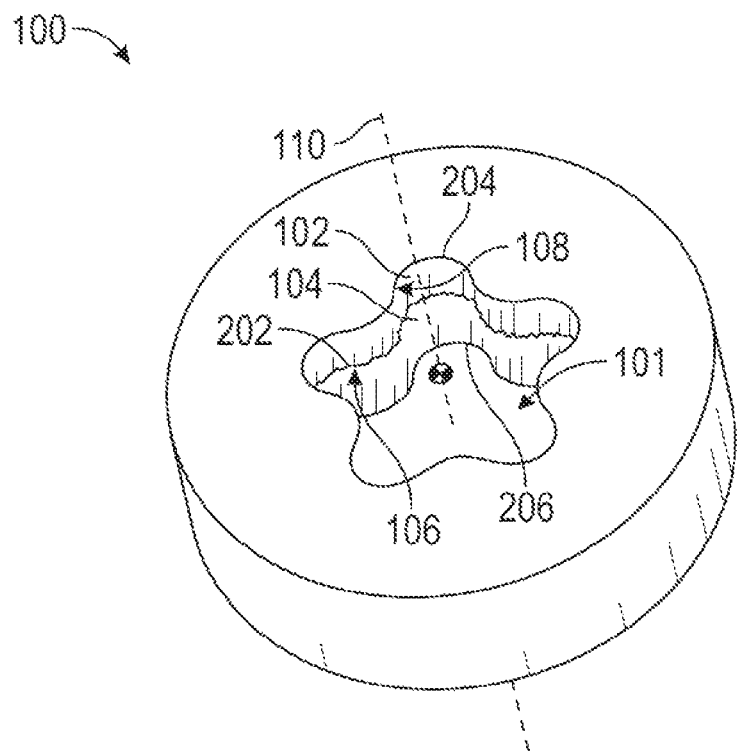
FIG. 5 representatively illustrates a perspective view of the socket area having five recessed lobes in accordance with an exemplary embodiment of the present technology.

The present technology may be described in terms of functional block components and various processing steps. Such functional blocks may be realized by any number of components configured to perform the specified functions and achieve the various results. For example, the present technology may employ various types of materials, fastening devices, driver systems and the like, which may carry out a variety of functions. In addition, the present technology may be practiced in conjunction with any number of processes such as the manufacture of fasteners, mechanical attachment, and torque transmitting systems, and the system described is merely one exemplary application for the invention. Further, the present technology may employ any number of conventional techniques for metalworking, component manufacturing, tooling fabrication, and/or forming surfaces.

Methods and apparatus for a fastener head having a dual zone socket area according to various aspects of the present technology may operate in conjunction with any suitable torque delivery system. Various representative implementations of the present technology may also be applied to any device capable of rotating fasteners, such as a driver bit, screwdriver, and the like.

Referring now to FIGS. 1-5, a fastener head 100 for a fastener such as a screw or bolt may comprise a recessed socket area 101 formed by a sidewall extending into the fastener head 100 and arranged around a longitudinal axis 110 of the fastener head 100. The sidewall may comprise an upper edge 204 disposed along or proximate a top surface of the fastener head 100 and a lower edge 206 disposed at or proximate to a lower most section of the recessed socket area 101. The sidewall may be configured in any suitable shape or dimension for receiving a driver bit 1400 (see FIG. 14) and may include one or more surfaces adapted to allow for the transfer of torque between the driver bit 1400 and the fastener head 100. The sidewall may comprise a plurality of torque surfaces upon which forces may be applied to turn the fastener head 100 in a clockwise (installation) direction or a counter-clockwise (removal) direction. For example, a driving surface 106 may comprise a first torque surface for receiving a driving force from the driver bit 1400 when the fastener is being installed, or otherwise screwed into place, generally in a clockwise rotation. Similarly, a removal face 108 may comprise a second torque surface for receiving a removal force (e.g. counter-clockwise rotation) from the driver bit 1400.

The driving surface 106 provides a contact area for receiving an applied torque from the driver bit 1400. It is known that increasing a contact area along the driving surface 106 allows an applied torque to be more evenly distributed across the entire driving surface 106 and may allow for increased torque values while also making the recessed socket area 101 less susceptible to cam-out. The driving surface 106 may be configured to comprise any suitable shape or dimension. The driving surface 106 may comprise a substantially flat surface or the driving surface 106 may be formed by a curving surface. Similarly, the removal surface 108 provides a second contact area for receiving an applied torque from the driver bit 1400. The removal surface 108 may be configured to comprise any suitable shape or dimension.

The position and location of the driving and removal surfaces 106, 108 are determined, at least in part, by the shape the sidewall makes around the longitudinal axis 110. For example, referring now to FIGS. 1-3 and 6-10, for fasteners having a recessed socket area 101 with a sidewall arranged with straight wall segments 112 to form patterns such as triangles, squares, pentagons, hexagons, and the like, the driving and removal surfaces 106, 108 are located on opposite sides of each wall segment 112. Referring now to FIGS. 4, 5, and 11-13, for fasteners having a recessed socket area 101 with a sidewall arranged in a curvilinear line to form patterns having multi-lobular driving surfaces such as a 4 lobe Phillips, a 6 lobe Torx® design, or the like, the driving and removal surfaces 106, 108 are located on opposite sides of each lobe 402. One of ordinary skill in the art will recognize that these concepts can be applied to recessed socket areas 101 having any number of lobes 402 or straight walled segments 112.

Referring now to FIGS. 1-5, the sidewall may also comprise an upper wall section 102 and a lower wall section 104. The upper wall section 102 tapers inwardly from the upper edge 204 towards the longitudinal axis 110. The taper of the upper wall section 102 creates a reduction in a cross-sectional area of the recessed socket area 101 between the upper edge 204 and a transition line 202 between the upper and lower wall sections 102, 104.

The upper wall section 102 may comprise a taper of between about 1° (one degree) and about 3.6° (three and three-fifths degrees) relative to the longitudinal axis 110. For example, in one embodiment, the upper wall section 102 may taper inwardly by an angle of approximately 1.5° (one and one-half degrees). In an alternative embodiment, the upper wall section 102 may taper inwardly by an angle of between 1.25° (one and one-quarter degrees) and 1.5° (one and one-half degrees).

The upper wall section 102 extends only partway down into the recessed socket area 101. The depth that the upper wall section 102 extends into the recessed socket area 101 may be determined according to any suitable criteria such as a desired amount of contact area or a wedging affect between the fastener head 100 and an inserted driver bit. In one embodiment, the upper wall section 102 may comprise a height of less than half of the total depth of the recessed socket area 101. For example, the upper wall section 102 comprises a height of about one-third the total depth of the recessed socket area 101. In an alternative embodiment, the wall section 102 may comprise a height between one-quarter and three-quarters the total depth of the recessed socket area 101.

The lower wall section 104 forms a vertical surface that extends from the transition line 202 to the lower edge 206. The cross-sectional area of the recessed socket area 101 remains constant along the entire height of the lower wall section 104. For example, referring now to FIGS. 1-5, in one embodiment the surfaces of the upper and lower wall sections 102, 104 may be aligned with each other such that the cross-sectional area of the recessed socket area 101 is the same at any point along the height of the lower wall section 104. This uniformity in cross-sectional area may allow for a prior art driver bit having completely vertical driving and removal surfaces to fit within the recessed socket area 101.

Alternatively, and referring now to FIGS. 6-13, the cross-sectional area of the recessed socket area 101 along the lower wall section 104 may not remain constant along the entire height of the lower wall section 104 due to an offset between the lower wall section 104 and the upper wall section 102. For example, the entire lower wall section 104 between the lower edge 206 and the transition line 202 may be rotated about the longitudinal axis 110 relative to the upper edge 204. The resulting change to the surfaces of the upper and lower wall sections 102, 104 creates a region of varying surface taper in the upper wall section 102 and a region of varying vertical height in the lower wall section 104.

Figure 6:
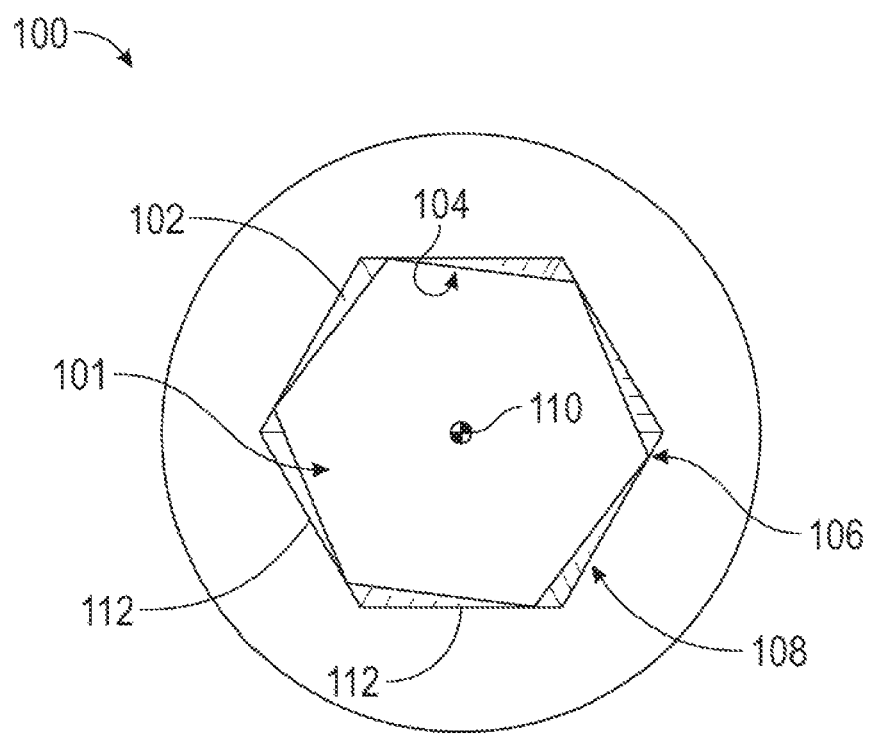
FIG. 6 representatively illustrates a top view of an offset lower wall section of the fastener in accordance with an exemplary embodiment of the present technology.
Figure 7:
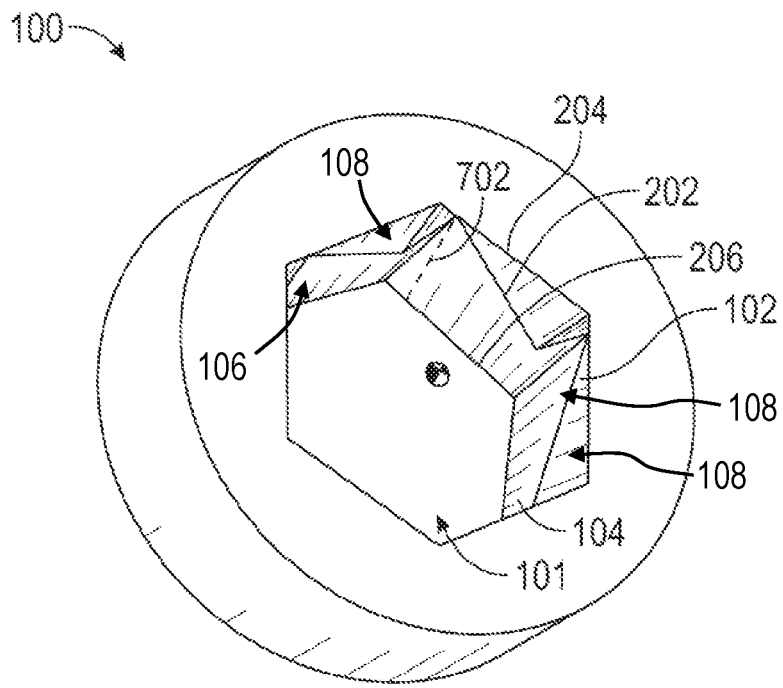
FIG. 7 representatively illustrates a first perspective view of the offset lower wall section of the fastener in accordance with an exemplary embodiment of the present technology.
Figure 8:
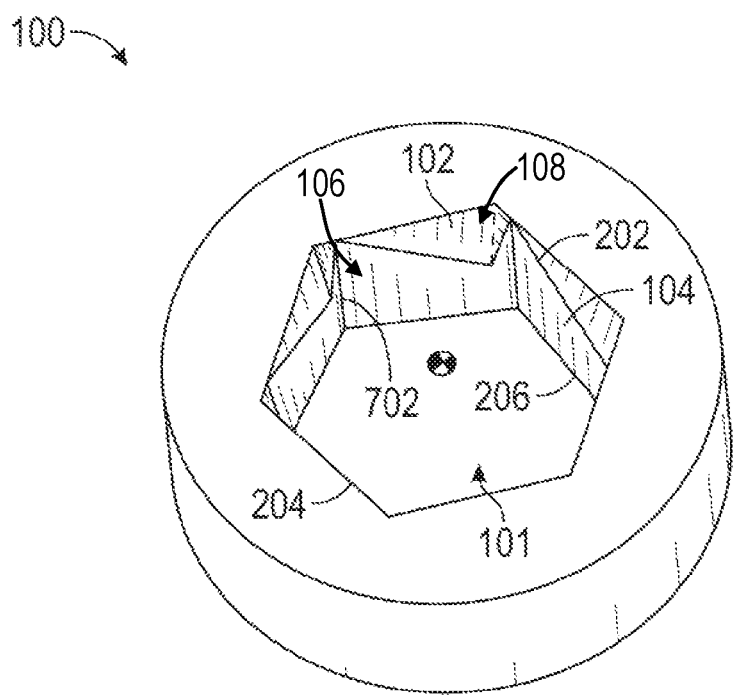
FIG. 8 representatively illustrates a second perspective view of the offset lower wall section of the fastener in accordance with an exemplary embodiment of the present technology.

Referring now to FIGS. 6-8, in one embodiment, the lower edge 206 of a sidewall having six wall segments 112 may be rotated by between 1° and 6° (one degree and six degrees) in a generally clockwise direction about the longitudinal axis 110 relative to the upper edge 204. Unlike the non-offset lower wall section 104 (see FIGS. 2 and 3) where each wall segment 112 has a uniform and generally rectangular surface area, the offset of the lower wall section 104 in this embodiment alters the surfaces of both the upper and lower wall sections 102, 104 causing the transition line 202 to be angled downward contrary to the horizontal transition line 202 in the non-offset embodiment of FIGS. 1-3. The surfaces of the upper and lower wall section 102, 104 take on more complex shapes causing an alteration in the size and shape of both the tapering region of the upper wall section 102 and the vertical region of the lower wall section 104. With particular reference to the upper wall section 102, the offset of the lower wall section 104 causes the surface of the tapering region to vary in height between the driving surface 106 and the removal surface 108. Specifically, the a depth that the tapering region of the upper wall section 102 extends downward into the recessed socket area 101 is greater at the removal surface 108 than it is at the driving surface 106. As a result, the upper wall section 102 extends more deeply into the recessed socket area 101 along the removal surface 108 portion of the sidewall than along the driving surface 106 portion of the sidewall.

Similarly, the vertical surface of the lower wall section 104 is altered such that a height of the vertical surface is greater along the driving surface 106 of the sidewall than it is along the removal surface 108. Because upper wall section 102 comprises less taper at the driving surface 106, a vertical, or substantially vertical, line of insertion 702 is formed between the upper edge 204 and the lower edge 206. This near vertical line of insertion 702 may create a larger contact area along the entire driving surface 106 for the driving force to act on as compared the non-offset embodiment of FIGS. 1-3.

By maintaining the substantially vertical line of insertion 702 along the entire depth of the recessed socket area 101, there is an increase in surface contact between the driver bit and the sidewall of the fastener head 100 when the driver bit is applying a force to tighten the fastener. The increased surface contact spreads the applied loads over a greater area and may prevent and/or reduce the likelihood that the driver bit will break during use or that the recessed socket area 101 may be prematurely worn as a result of point loading.

The extent to which the line of insertion 702 along the driving surface 106 of the lower wall section 104 is vertical along the entire depth of the recessed socket area 101 is determined based on the amount of offset or rotation between the lower wall section 104 and the upper wall section 102. An offset that results in the lower edge 206 of the driving surface 106 of the lower wall section 104 aligning completely with the upper edge 204 will result in a completely vertical line of insertion 702. For example, in one embodiment for a hex shaped recessed socket area 101, the rotation of the lower wall section 104 relative to the upper wall section 102 to generate a completely vertical line of insertion 702 may be about 6° (six degrees). Accordingly, an offset of less than 6° (six degrees) results in a line of insertion 702 along the driving surface 106 that is not completely vertical but ends at some point below the upper edge 204 at the transition line 202 and is replaced by the tapering surface of the upper wall section 102.

Figure 9:
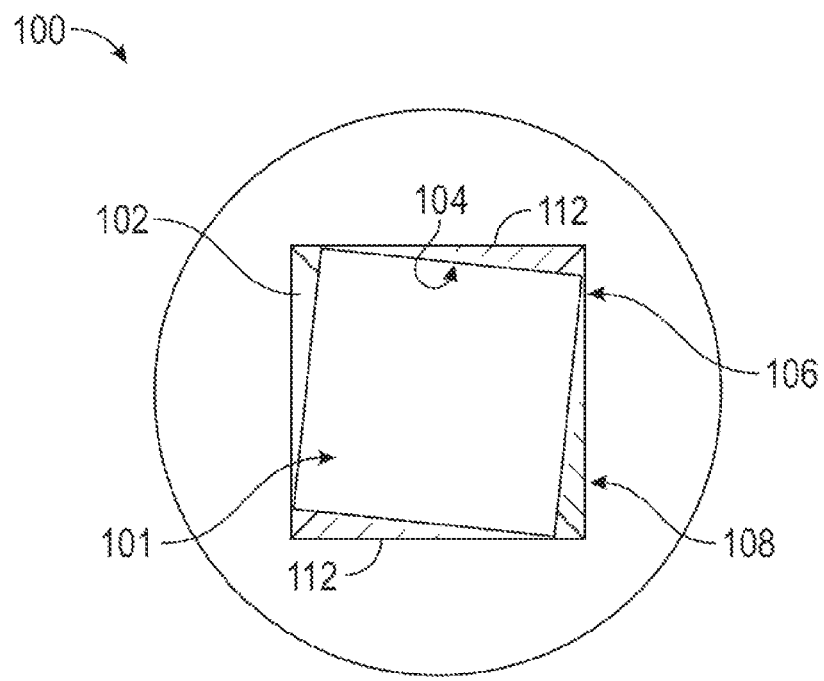
FIG. 9 representatively illustrates a top view of an offset lower wall section of a third fastener having four driving surfaces in accordance with an exemplary embodiment of the present technology.
Figure 10:
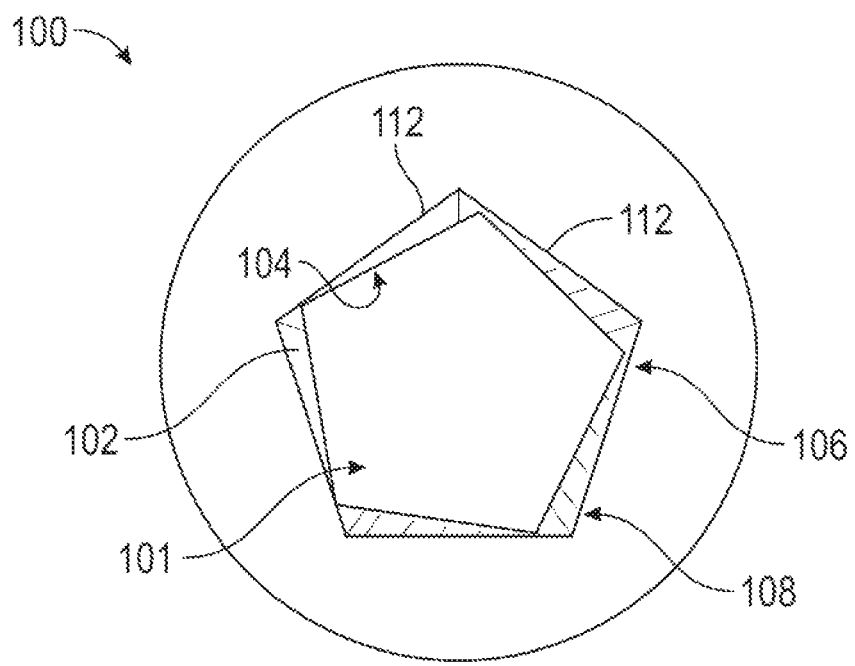
FIG. 10 representatively illustrates a top view of an offset lower wall section of a fourth fastener having five driving surfaces in accordance with an exemplary embodiment of the present technology.

Referring now to FIGS. 9 and 10, the varying vertical and tapering regions for other embodiments formed by straight walled segments 112 is substantially the same as that described above for the embodiment having six equally sized straight walled segments 112. The amount of offset required to obtain a completely vertical line of insertion 702 along the driving surface 106, however, may vary according to the particular geometry of the wall segments 112. For example, a fastener head 100 comprising a sidewall having three or four equally sized straight walled segments 112 may require a larger offset or rotation than a fastener head 100 having a sidewall comprising five or more equally sized straight walled segments 112.

A natural result of creating a larger vertical line of insertion 702 along the driving surface 106 from the offset between the upper and lower wall sections 102, 104 is that the amount of contact between an industry standard driver bit, such as a 2 mm hex key, and the recessed socket area 101 along the removal surface 108 is reduced. Referring again to FIGS. 1-3, in the non-offset embodiment, the vertical surface along both the driving and removal surfaces 106, 108 is the same. This results in an identical amount of surface contact on the driving surface 106 during installation as on the removal surface 108 during removal of the fastener.

Conversely, and referring again to FIGS. 6-8, the offset creates a differing amount of surface contact between the driver bit and the driving and removal surfaces 106, 108. For example, if a hex key bit commonly known in the art is inserted into the recessed socket area 101 such that the driver bit extends into the lower wall section 104, when a driving (clockwise rotation) force is applied the driver bit will contact the sidewall along the line of insertion 702. In the case of the embodiments shown in FIGS. 6-8, the surface contact between the driver bit and the fastener head 100 along the line of insertion 702 may comprise the entire depth of the recessed socket area 101. If a removal (counter-clockwise) force is applied, the driver bit will contact the sidewall of the recessed socket area 101 along the removal face 108 and due to the tapering region of the upper wall section 102, the surface contact between the driver bit and the fastener head 100 will only exist in the portion of the lower wall section 104 that is below the transition line 202. The implication of this configuration is that the removal force is spread over a smaller area than that of the driving force. Since it generally takes less removal force to loosen the fastener than is required to drive the fastener, the potential for breaking a prior art driver bit or causing premature wear/cam-out of the recessed socket area 101 is reduced.

With continued reference to FIGS. 6-10, if a driving bit having fully tapering walls (non-vertical) as commonly known in the art is inserted into the recessed socket area 101 then in addition to contact along the line of insertion 702, the contact area between the recessed socket area 101 and the driving bit may be increased to include the tapering region of the upper wall section 102. This increase in surface area contact would provide an increase along the removal face 108 allowing the driving and removal forces to be applied over a larger area.

Figure 11:
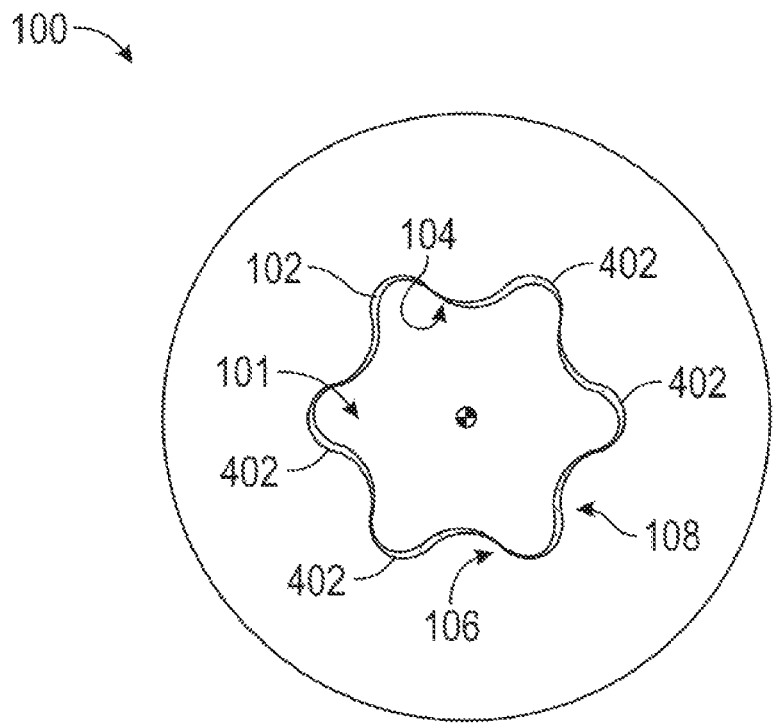
FIG. 11 representatively illustrates a top view of an offset lower wall section of a fifth fastener having a nonlinear sidewall with six driving surfaces in accordance with an exemplary embodiment of the present technology.
Figure 12:
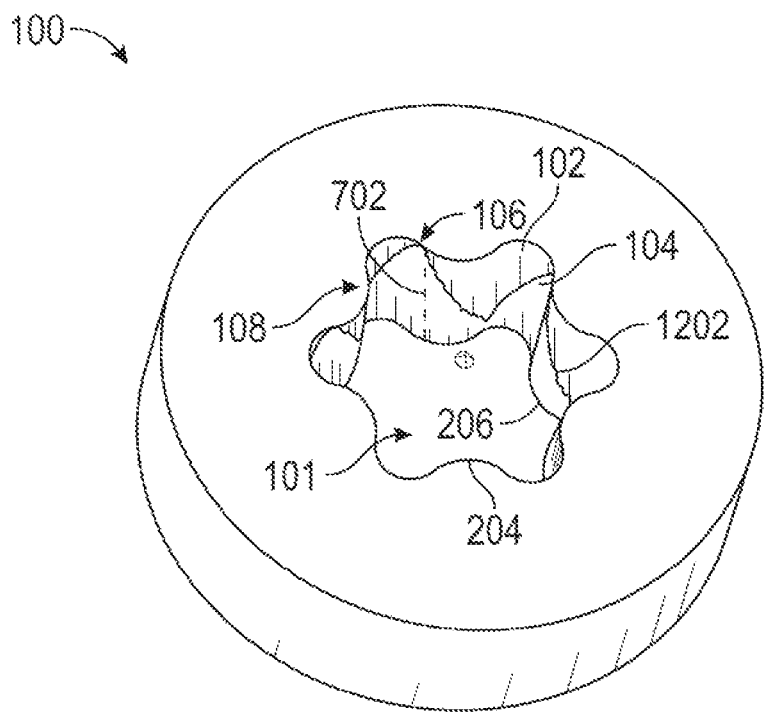
FIG. 12 representatively illustrates a prior first perspective view of the fastener shown in FIG. 11.
Figure 13:
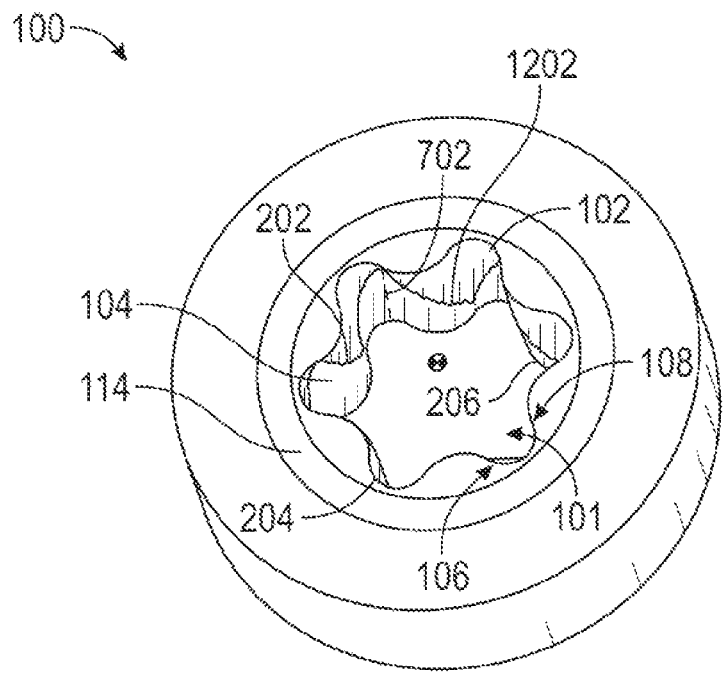
FIG. 13 representatively illustrates a second perspective view of the fastener shown in FIG. 12.

Referring now to FIGS. 11-13, in an alternative embodiment having a curvilinear sidewall, the lower edge 206 of a sidewall having six lobes 402 may be rotated by between 1° and 6° (one degree and six degrees) in a generally clockwise direction about the longitudinal axis 110 relative to the upper edge 204. Unlike the non-offset lower wall section 104 (see FIGS. 4 and 5) where each lobe 402 comprises a uniform tapering section and vertical section, the offset of the lower wall section 104 in this embodiment alters the surfaces of both the upper and lower wall sections 102, 104 resulting in a curvilinear transition line 1202. With particular reference to the upper wall section 102, the offset of the lower wall section 104 causes the surface area of the taper to vary between the driving surface 106 and the removal surface 108 of each lobe 402. Specifically, the surface area formed by the taper is greater on the removal surface 108 side of each lobe 402 than it is on the driving surface 106 side of the same lobe 402. As described above, the tapered surface of the upper wall section 102 extends more deeply into the recessed socket area 101 along the removal surface 108 of each lobe 402 than along the driving surface 106 of each lobe 402.

Similarly, the vertical surface of the lower wall section 104 is altered such that a height of the vertical surface is greater along the driving surface 106 of the sidewall than it is along the removal surface 108. Because upper wall section 102 comprises less taper at the driving surface, a vertical, or substantially vertical, line of insertion 702 is formed between the upper edge 204 and the lower edge 206. This near vertical line of insertion may 702 create a larger contact area along the entire driving surface 106 for the driving force to act on as compared the non-offset embodiment of FIGS. 4 and 5.

The extent to which the line of insertion 702 along the driving surface 106 of each lobe 402 is vertical along the entire depth of the recessed socket area 101 is determined based on the amount of offset or rotation between the lower wall section 104 and the upper wall section 102. An offset that results in the lower edge 206 of the driving surface 106 of the lower wall section 104 aligning completely with the upper edge 204 will result in a completely vertical line of insertion 702. For example, in one embodiment, the rotation of the lower wall section 104 relative to the upper wall section 102 to generate a completely vertical line of insertion 702 may be about 4° (four degrees). Accordingly, an offset of less than 4° (four degrees) results in a line of insertion 702 along the driving surface 106 that is not completely vertical but ends at some point below the upper edge 204 at the transition line 1202 and is replaced by the tapering surface of the upper wall section 104.

As described above for the straight walled segment embodiment, the offset creates a difference in the amount of surface contact between an inserted standard driver bit and the driving and removal surfaces 106, 108. The concept is the same in the curvilinear sidewall embodiment, except that the driving and removal surfaces 106, 108 are disposed on opposing surfaces of each lobe 402 rather than along the same surface of the straight walled segment 112. In addition, the tapering portion of the removal surface 108 tends to create a wedge fit directing a driving face of a typically tapered driver bit towards the line of insertion 702.

Figures 14A, 14B:
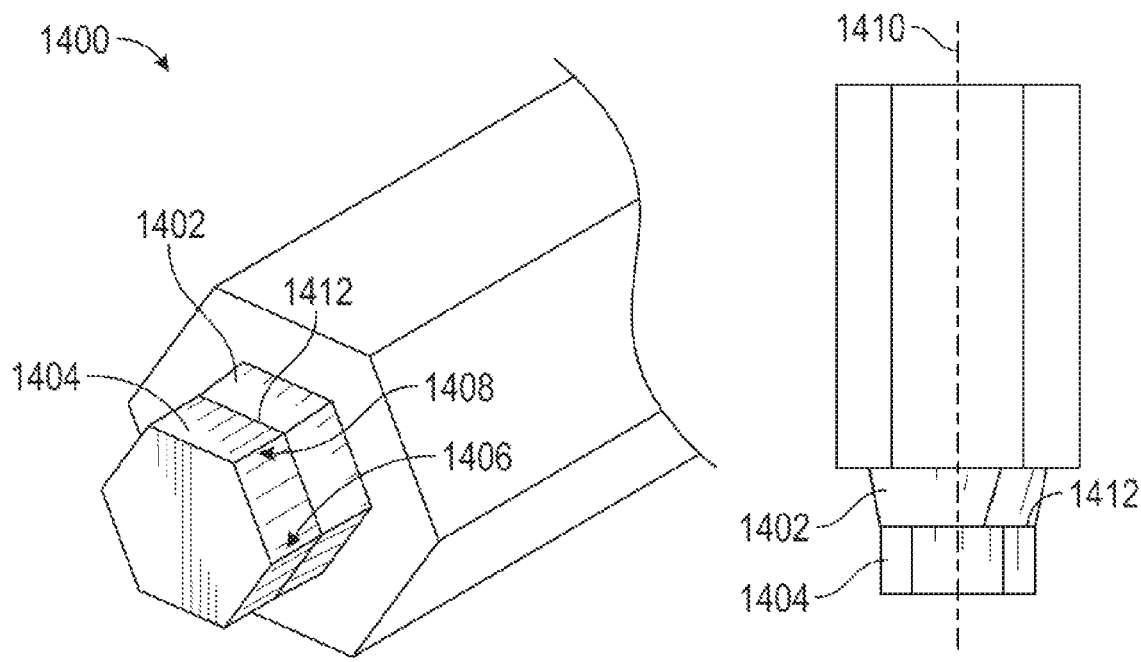
FIG. 14A representatively illustrates a perspective view of a driver bit corresponding to the socket area of FIGS. 1-3 in accordance with an exemplary embodiment of the present technology.
FIG. 14B representatively illustrates a side view of the driver bit shown in FIG. 14A in accordance with an exemplary embodiment of the present technology.

Referring now to FIGS. 14A-15, the driver bit 1400 may comprise any suitable device or system for mating with the fastener head 100 to facilitate a transfer of torque from the driver bit 1400 to the fastener head 100. For example, the driver bit 1400 may comprise a sidewall or curving multi-lobular surface configured to be selectively inserted into the recessed socket area 101 of the fastener head 100 and at least partially conform to the recessed socket area 101. A fully conforming driver bit 1400 comprising both a tapering section 1402 and a vertical walled section 1404 may create sufficient surface contact with the recessed socket area 101 to couple the driver bit 1400 and the fastener head 100 together through a compressed, wedge, or "stick fit" such that the fastener head 100 does not fall off or otherwise automatically disengage from the driver bit 1400 after the driver bit 1400 has been inserted into the recessed socket area 101. This design encourages the wedging effect towards the driving surface 106 along the tapering section 1402.

In an alternative embodiment, the driver bit 1400 may comprise a longer tapering section 1402 than that of the upper wall section 102 of the recessed socket area 101. By including a longer tapering section 1402, the vertical walled section 1404 of the driver bit 1400 may be able to penetrate further into the lower wall section 104 of the recessed socket area 101 to provide greater surface contact across the lower wall section 104 despite the presence of any coatings on the driver bit 1400 or the fastener head 100. The tapering section 1402 of the driver bit 1400 may comprise the same degree of taper (between 1° (one degree) and 3.5° (three and one-half degrees)) towards a longitudinal axis 1410 of the driver bit 1400 as that of the upper wall section 102.

In addition, the vertical walled section 1404 may be sized such that it is slightly smaller than the size of a standard socket of a fastener head 100. In one embodiment, the vertical walled section 1404 of the driver bit 1400 may be sized at about 97%-98% of an intended corresponding socket area. For example, if the driver bit 1400 is intended for use with a standard 2 mm hex socket, then the vertical walled section 1404 may comprise an outermost radius of between 1.94 mm and 1.96 mm. The smaller size of the vertical walled section 1404 accounts for the presence of any surface coatings that may be applied to the recessed socket area 101 of the fastener head 100 and/or on the surface of the driver bit 1400 itself.

In yet another embodiment, the driver bit 1400 may comprise only a tapering section 1402. For example, rather than include a vertical walled section 1404 configured to match that of the lower wall section 104 of the fastener head 100, the driver bit 1400 may taper along the entire length of the sidewall or multi-lobular surface between a shank end and a bit end of the driver bit 1400. As described above, the end of the driver bit 1400 may be sized at about 97%-98% of an intended corresponding socket area to account for the presence of surface coatings.

Referring now to FIGS. 16A-18B, in yet another embodiment, the vertical walled section 1404 may be offset from the tapering section 1402. The offset may be formed in a similar manner as described above with respect to the upper and lower wall sections 102, 104 of the recessed socket area 101 except that the offset of the driver bit 1400 may be in the opposite direction when viewed from the end of the driver bit 1400. This may create a substantially fully conforming surface engagement between the recessed socket area 101 and the sidewall of the driver bit 1400. More specifically, a surface height of the tapering section 1402, defined by a bit transition line 1412 disposed between the tapering section 1402 and the vertical wall section 1404, is greater at the removal surface 1408 than the surface height is at the driving surface 1406. In other words, the tapering section 1402 extends further towards the end of the driver bit 1400 along the removal surface 1408 portion driver bit 1400 than along the driving surface 1406.

Further, the vertical surface of the vertical walled section 1404 is altered such that a height of the vertical surface is greater along the driving surface 1406 of the sidewall than it is along the removal surface 1408. Because the tapering section 1402 comprises less surface area along the driving surface 1406, a vertical, or substantially vertical, line of insertion may be formed between a shank end of the driver bit 1400 and an end of the vertical walled section 1404 of the driver bit 1400. This near vertical line of insertion may create a larger contact area along the entire driving surface 1406 for the driving force to act on as compared the non-offset embodiment of FIGS. 14A-15.

When embodiments of the driver bit 1400 shown in FIGS. 16A-18B are used in conjunction with mating fastener heads 100 represented by FIGS. 6-10, the surface areas formed by the tapering and vertical portions act to enhance a "stick-fit" feature of the components. For example, referring now to FIGS. 16A, 17A, and 18A, the tapering sections 1402 and the vertical wall sections 1404 of the driver bit 1400 each form triangular shaped surface areas. Similarly, the upper and lower wall sections 102, 104 of the recessed socket area 101 also form triangular surface areas. The triangular surface areas may largely conform to each other to create triangular intersections areas when the driver bit 1400 is inserted into the recessed socket area 101. The triangular intersections areas provide much greater surface contact between the driver bit 1400 and the fastener head 100 than can be achieved through other commonly used methods of creating a wedge or "stick-fit" that only fall along a vertical or horizontal line of contact. The larger contact area allows the driver bit 1400 to hold the fastener straighter and with better grip than existing wedge or "stick-fit" designs. Better grip between the driver bit 1400 and the fastener head 100 provides increased benefits for machines such as robotic usage since the faster is held more tightly and straighter after the driver bit 1400 is inserted into the recessed socket area 101.

Figures 19A, 19B:
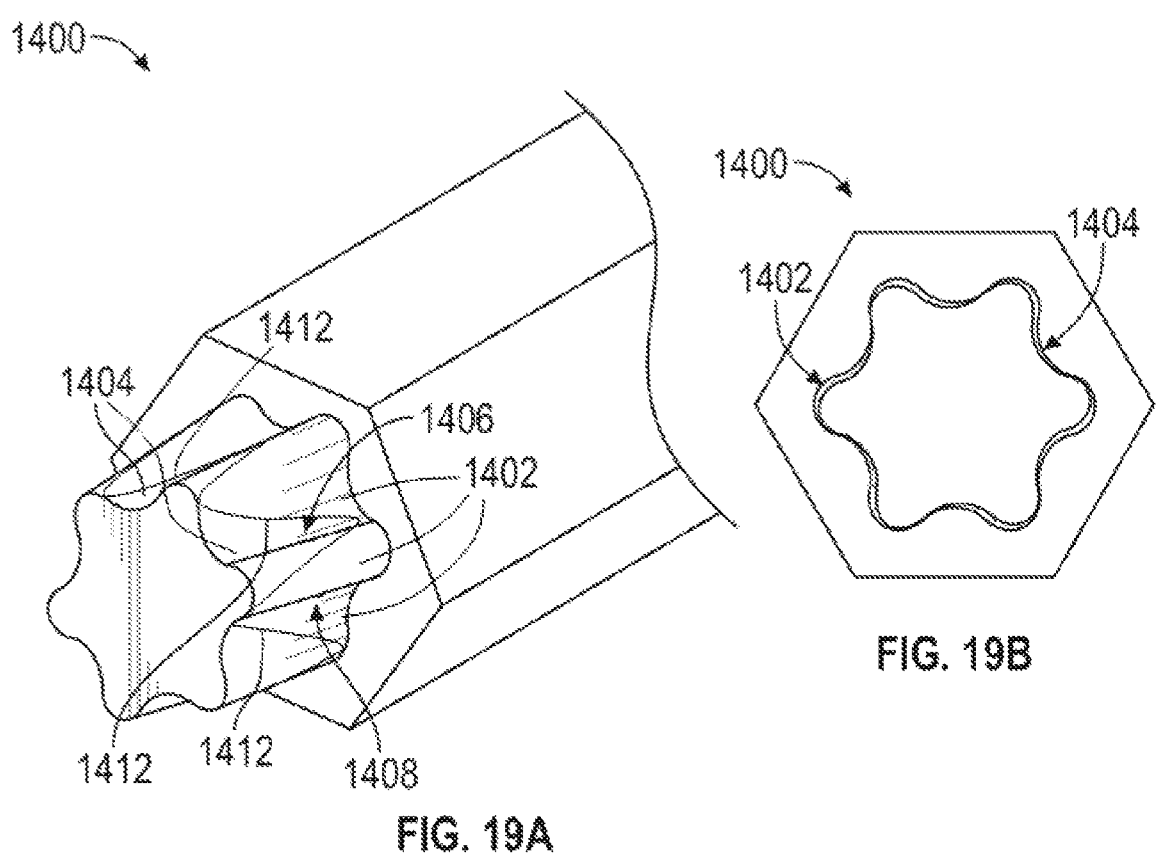
FIG. 19A representatively illustrates a perspective view of a driver bit corresponding to the socket area of FIGS. 11-13 in accordance with an exemplary embodiment of the present technology.
FIG. 19B representatively illustrates an end view of the driver bit of FIG. 19A in accordance with an exemplary embodiment of the present technology.

Referring now to FIGS. 19A and 19B, in an embodiment where the sidewall of the driver bit 1400 comprises a curvilinear sidewall forming a multi-lobular surface and the vertical walled section 1404 is offset from the tapering section 1402, the surfaces of both the tapering and vertical walled sections 1402, 1404 form a curvilinear bit transition line 1412. This causes the height of the tapered surface to differ between the driving surface 1406 and the removal surface 1408 of each lobe 402. As with the previous embodiment, the surface height formed by the taper is greater on the removal surface 1408 of each lobe 402 than it is on the driving surface 1406 of each lobe 402. As described above, the tapered surface of the tapering section 1402 extends further down the length of the multi-lobular surface of the driver bit 1400 along the removal surface 1408 of each lobe 402 than along the driving surface 1406 of each lobe 402.

Similarly, the vertical surface of the vertical walled section 1404 is altered such that the height of the vertical surface is greater along the driving surface 1406 of each lobe 402 than it is along the removal surface 1408 of the lobe 402. Because the tapering section 1402 comprises less taper along the driving surface 1406, a vertical, or substantially vertical, line of insertion may be formed between the shank end and the end of the driver bit 1400. This near vertical line of insertion may create a larger contact area along the entire driving surface 1406 for the driving force to act on as compared the non-offset embodiment of FIG. 15.

The particular implementations shown and described are illustrative of the invention and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the technology has been described with reference to specific exemplary embodiments. Various modifications and changes may be made, however, without departing from the scope of the present technology as set forth in the claims. The specification and figures are illustrative, rather than restrictive, and modifications are intended to be included within the scope of the present invention. Accordingly, the scope of the technology should be determined by the claims and their legal equivalents rather than by merely the examples described.

For example, the steps recited in any method or process claims may be executed in any order and are not limited to the specific order presented in the claims unless specifically recited in the claims. Additionally, the components and/or elements recited in any apparatus claims may be assembled or otherwise operationally configured in a variety of permutations and are accordingly not limited to the specific configuration recited in the claims. Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A driver bit having a longitudinal axis, comprising:
   a sidewall extending between a shank end and a bit end; and
   a plurality of driving surfaces and removal surfaces disposed along the sidewall, wherein:
   a tapering section of the sidewall tapers inwardly towards the longitudinal axis between about one degree and about three and three-fifths degrees from the shank end to a curvilinear bit transition line; and
   a vertical walled section of the sidewall forms a vertical surface parallel to the longitudinal axis and is disposed between the curvilinear bit transition line and the bit end, wherein:

the vertical walled section of the sidewall is offset in the clockwise direction from the tapering section of the sidewall by a rotation of between one degree and six degrees causing the curvilinear bit transition line to vary along a length of the plurality of driving surfaces and removal surfaces between the shank end and the bit end; and a driving surface of the vertical walled section of the sidewall at the bit end is aligned with a driving surface of the tapering section of the sidewall to form a vertical line of insertion extending from the shank end to the bit end.

2. A driver bit according to claim 1, wherein:

the sidewall comprises at least three wall segments; and each wall segment comprises a driving surface and a removal surface.

3. A driver bit according to claim 1, wherein:

the sidewall forms a curving multi-lobular surface having six lobes; and each lobe comprises a driving surface on a first side of the lobe and a removal surface on a second side of the lobe.

4. A driver bit according to claim 1, wherein:

the sidewall comprises a curving multi-lobular surface having at least three lobes; and each lobe comprises a driving surface disposed on a first side of the lobe and a removal surface disposed on an opposite second side of the lobe.

5. A driver bit according to claim 1, wherein:

the curvilinear bit transition line between the tapering section and the vertical walled section is not perpendicular to the longitudinal axis such that the curvilinear bit transition line extends closer to the bit end along each removal surface than along each driving surface;

a tapering section along each removal surface extends closer to the bit end and tapers inward a greater distance than the tapering section along each driving surface; and a vertical walled section along each driving surface extends closer to the shank end and remains vertical a greater distance than the vertical walled section along each removal surface.

* * * * *